G. SUMMERS.
MACHINE FOR SHEARING SHEET METAL.
No. 187,065. Patented Feb. 6, 1877.
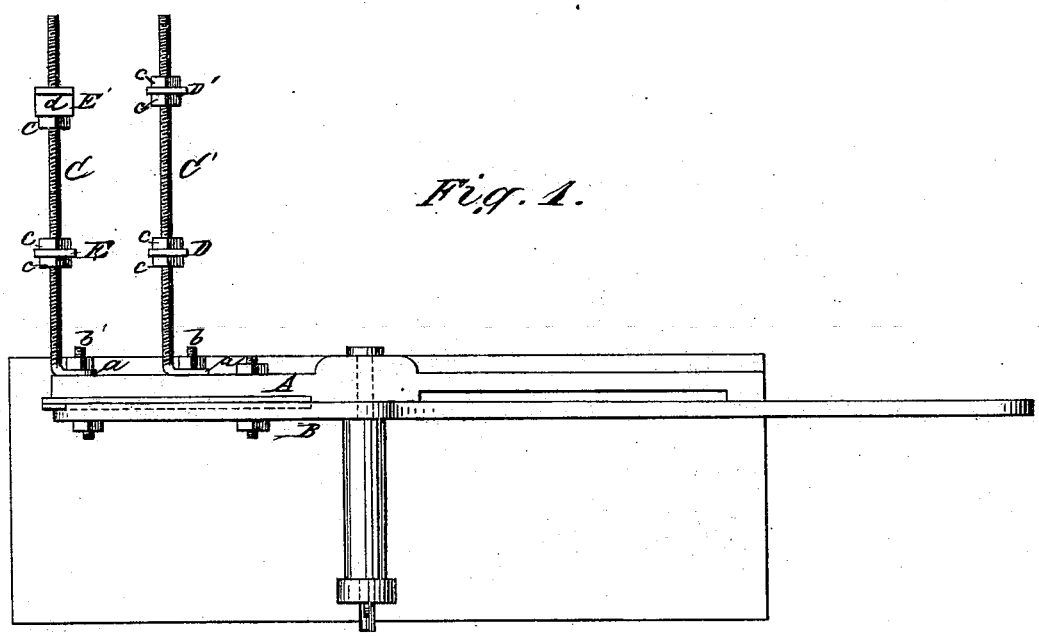
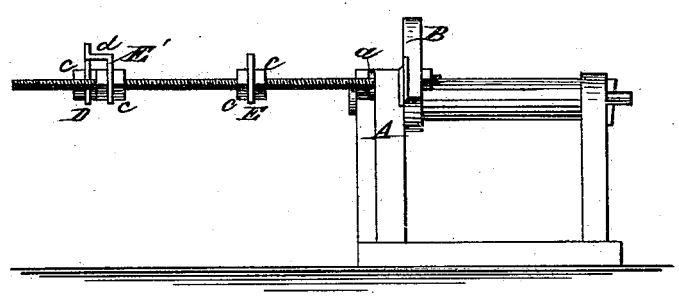
WITNESSES:
H. Rydquist
J.H. Scarborough
INVENTOR:
Geo. Summers
BY
ATTORNEYS.

UNITED STATES PATENT OFFICE.

GEORGE SUMMERS, OF NILES, OHIO.

IMPROVEMENT IN MACHINES FOR SHEARING SHEET METAL.

Specification forming part of Letters Patent No. 187,065, dated February 6, 1877; application filed December 11, 1876.

*To all whom it may concern:*

Be it known that I, GEORGE SUMMERS, of Niles, in the county of Trumbull and State of Ohio, have invented a new and Improved Shear-Gage, of which the following is a specification:

Figure 1 is a top view. Fig. 2 is a front elevation.

Similar letters of reference indicate corresponding parts.

The invention will first be described in connection with the drawing, and then pointed out in the claim.

In the drawing, A is the lower or fixed jaw of metal-shears, and B the movable jaw. C C' are threaded rods, upon which the feet $a$ are formed. These feet are fastened to the fixed jaw of the shears by means of bolts $b\ b$, and project therefrom at right angles. D D' E E' are guide plates or blocks, that are fitted loosely to the rods C C', and are held in place by means of nuts $c$.

Several sets of guide-plates may be provided, that increase in height as they are placed farther from the blade of the shears, so that a number of widths may be cut without readjusting the gage.

The plate E' is offset at $d$, to form a rest for the edge of the sheet.

The rods C C' may be plain, and the guides may be held in place by means of keys or set-screws.

With my invention the operation of cutting sheet metal into strips is facilitated, and the work is more perfectly done, the sides being parallel.

The upper knife-edge being in line with the side of movable blade, and a guide thus formed for trimming the first side of the sheet metal, the same guide may be used with one rod only in making short cuts.

What I claim is—

In shears for trimming metal, one or more rods, arranged as shown, and provided with guide-blocks, as and for the purpose specified.

GEORGE SUMMERS.

Witnesses:
W. J. GILMORE,
F. H. ERNST.